United States Patent
Otagaki et al.

(10) Patent No.: US 10,114,515 B2
(45) Date of Patent: Oct. 30, 2018

(54) METHODS AND APPARATUS FOR A CAPACITIVE SENSOR

(71) Applicant: SEMICONDUCTOR COMPONENTS INDUSTRIES, LLC, Phoenix, AZ (US)

(72) Inventors: Takayasu Otagaki, Gifu (JP); Kensuke Goto, Ashikaga (JP)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 186 days.

(21) Appl. No.: 15/284,021

(22) Filed: Oct. 3, 2016

(65) Prior Publication Data

US 2017/0115774 A1   Apr. 27, 2017

Related U.S. Application Data

(63) Continuation of application No. 15/283,872, filed on Oct. 3, 2016.

(60) Provisional application No. 62/246,238, filed on Oct. 26, 2015.

(51) Int. Cl.
  *G06F 3/045*    (2006.01)
  *G06F 3/044*    (2006.01)
  *G06F 3/041*    (2006.01)

(52) U.S. Cl.
  CPC ............ *G06F 3/044* (2013.01); *G06F 3/0416* (2013.01); *G06F 2203/04101* (2013.01); *G06F 2203/04108* (2013.01)

(58) Field of Classification Search
  CPC ................... G06F 3/044; G06F 3/0416; G06F 2203/04108; G06F 2203/04101
  See application file for complete search history.

(56) References Cited

U.S. PATENT DOCUMENTS

| | | | |
|---|---|---|---|
| 7,323,886 B2* | 1/2008 | Lee | G01R 27/2605 324/662 |
| 7,498,822 B2* | 3/2009 | Lee | H03K 17/962 324/658 |
| 9,259,168 B2* | 2/2016 | Marashdeh | A61B 5/05 |
| 9,506,967 B2* | 11/2016 | Liu | G01B 7/003 |
| 2015/0130743 A1* | 5/2015 | Li | G06F 3/044 345/174 |
| 2016/0162037 A1* | 6/2016 | Park | G06F 3/017 345/156 |
| 2017/0293362 A1* | 10/2017 | Heim | G06F 3/017 |

FOREIGN PATENT DOCUMENTS

| | | |
|---|---|---|
| JP | 2010257046 | 11/2010 |
| JP | 2011138540 | 7/2011 |

* cited by examiner

*Primary Examiner* — Rodney Amadiz
(74) *Attorney, Agent, or Firm* — The Noblitt Group, PLLC; Hettie L. Haines

(57) ABSTRACT

Various embodiments of the present technology may comprise methods and apparatus for a 3-dimensional capacitive sensor. The method and apparatus may comprise a sensing element formed along multiple planes to create a sensing field. The capacitive sensor comprises at least two parallel sensing planes. Each sensing plane may comprise two electrodes, where one electrode of each sensing plane be configured to operate as a transmission electrode and a reception electrode.

20 Claims, 19 Drawing Sheets

METHODS AND APPARATUS FOR A CAPACITIVE SENSOR

CROSS-REFERENCE TO RELATED APPLICATION

This application is a continuation of prior application Ser. No. 15/283,872, filed Oct. 3, 2016, which claims the benefit of U.S. Provisional Patent Application Ser. No. 62/246,238, filed on Oct. 26, 2015, and incorporates the disclosure of the application in its entirety by reference.

BACKGROUND OF THE TECHNOLOGY

Capacitive sensors operate by detecting changes in the capacitance formed between a transmission electrode and a sense electrode. A sensing circuit can recognize an object and determine the location, pressure, direction, speed and acceleration of the object as it is approaches and/or moves across the touch surface.

Electronic devices with touch sensing surfaces may utilize various capacitive sensing devices to allow a user to make selections and move objects by moving their finger (or stylus) relative to a capacitive sensing element. Mutual capacitance touch sensors not only have the ability to detect touch events on the sensing surface, but also have the ability to detect proximity events, in which an object is not touching the sensing surface, but is in close proximity to the sensing surface. The mutual capacitive touch sensor operates by measuring the capacitance of the capacitive sense element, and looking for a change in capacitance indicating a touch or presence of a conductive object. When the conductive object (e.g., a finger, hand, foot, or other object) comes into contact or close proximity with a capacitive sense element, the capacitance changes and the conductive object is detected. An electrical circuit may be utilized to measure the change in capacitance of the capacitive touch sense element, and the electrical circuit may convert the measured capacitance of the capacitive sense element into a digital value.

The ability of the mutual capacitance touch sensors to detect objects in close proximity to the sensing surface is limited by the size and operating specifications of the electronic device. In an effort to reduce the size of electronic devices, the size of the operational components, such as microprocessor chips, printed circuit boards, displays, memory chips, hard drives, batteries, interconnectivity circuitry, indicators, input mechanisms, and the like, are also reduced. There is, however, a desire to maintain operational specifications, such as operating power specifications, while increasing the functionality of the touch sensor.

Capacitive sensors may also be utilized to measure a volume and/or a level of some material, such as fluids, within a container. Capacitive sensors utilized in such applications may provide a more accurate measurement and may be more reliable than conventional indicators.

SUMMARY OF THE INVENTION

Various embodiments of the present technology may comprise methods and apparatus for a 3-dimensional capacitive sensor. The method and apparatus may comprise a sensing element formed along multiple planes to create a sensing field. The capacitive sensor comprises at least two parallel sensing planes. Each sensing plane may comprise two electrodes, where one electrode of each sensing plane be configured to operate as a transmission electrode and a reception electrode.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

Figure 1:
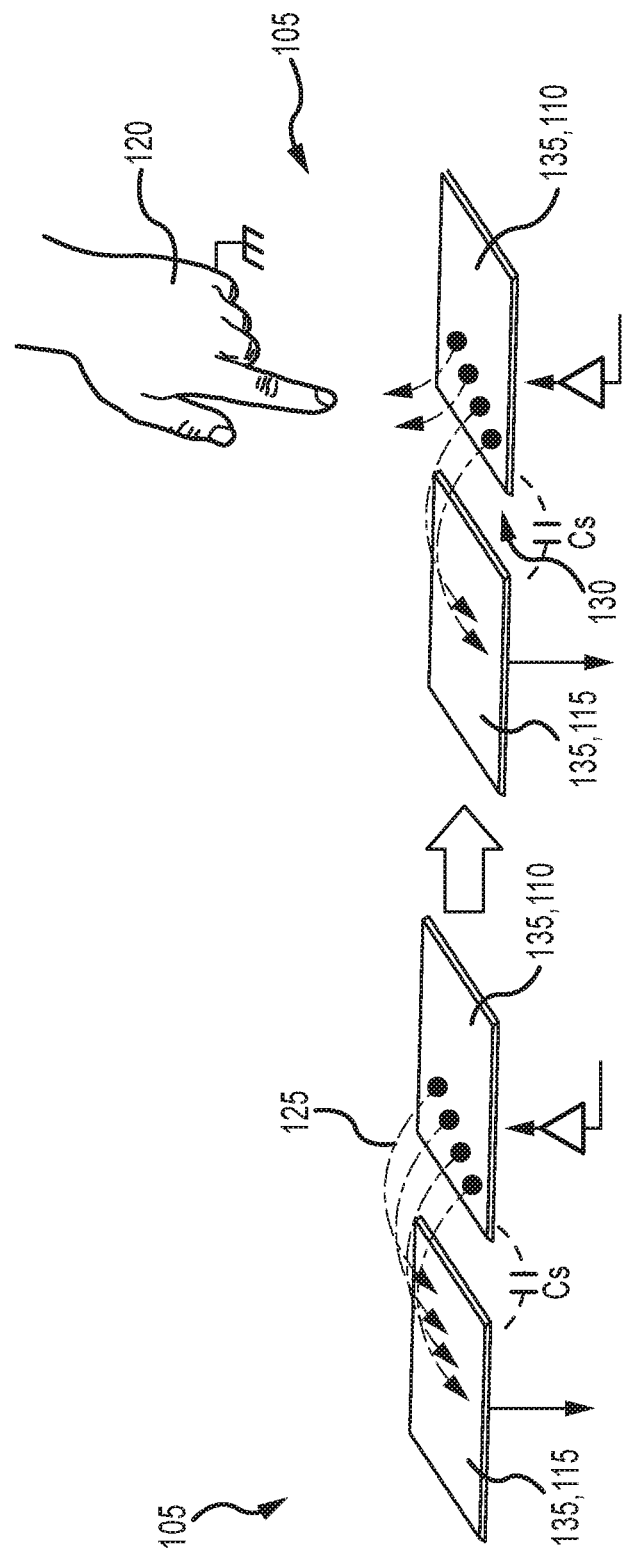
FIGS. 1A and 1B representatively illustrate a capacitive proximity sensor in accordance with a first exemplary embodiment of the present technology.

The present technology may be described in terms of functional block components and circuit diagrams. Such functional blocks and circuit diagrams may be realized by any number of components configured to perform the specified functions and achieve the various results. For example, the present technology may employ various types of capacitors, amplifiers, power sources, and the like, which may carry out a variety of functions. The methods and apparatus for a capacitive proximity sensor according to various aspects of the present technology may operate in conjunction with any electronic device and/or device input application, such as a cellular phone, an audio device, a gaming device, a television, a personal computer, and the like.

Referring to FIGS. 1A-B, 3, 4, and 5, in various embodiments of the present technology, a capacitive sensor 100 may detect an object by measuring a change in a capacitance and/or an output voltage (Vout) of the sensor 100. In various embodiments, the capacitive sensor 100 may comprise a sensing element 105 and operational circuitry that operate in conjunction to create a sensing field 125 and measure changes in the sensing field 125.

The capacitive sensor 100 may generate the sensing field 125, such as an electric field, at a surface 310 of the sensing element 105. In various embodiments, the capacitive sensor 100 may operate as a proximity sensor to detect an object within the sensing field 125. The sensing field 125 may form in a region between the surface 310 of the sensing element 105 and a maximum detection distance 305, where the sensing element 105 may detect an object 120, such as a human fingertip, a pen point or the like, when it enters the sensing field 125. As such, the object 120 may not need to physically touch the sensing element 105 to effect a change in the capacitance.

Figure 2:
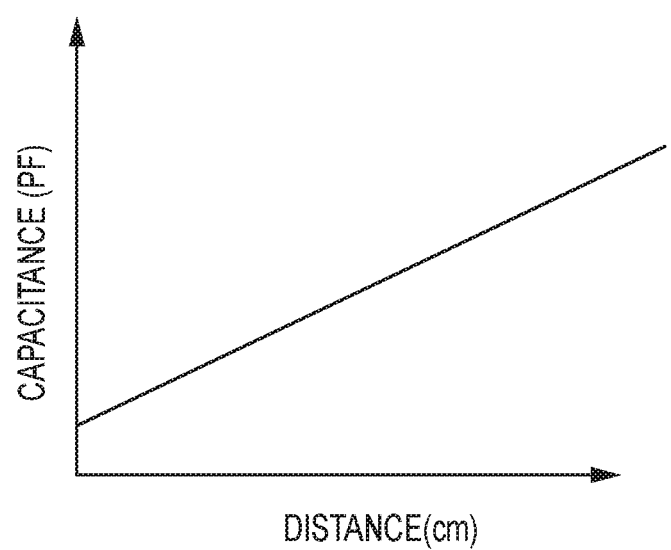
FIG. 2 graphically illustrates a relationship between distance from a sensing surface and capacitance of a capacitive proximity sensor in accordance with an exemplary embodiment of the present technology.

In various embodiments, the capacitive sensor 100 detect the object 120 by measuring and/or detecting changes in a resting capacitance and the output voltage of the sensing element 105 as a result of the object 120 entering the sensing field 125. In general, and referring to FIGS. 1B, 2, and 4, as the object 120 approaches, such as when a person's finger gets close to the sensing element 105 (decreasing a distance 315, FIG. 3), some of the sensing field 125 is absorbed by the object 120, decreasing the amount of energy detected by the sensing element 105 and reducing the capacitance. As the object 120 gets closer to the surface 310 of the sensing element 105, more of the sensing field 125 is absorbed by the object 120 and the capacitance may continue to decrease, causing Vout to increase. As Vout changes according to the amount of energy detected by the sensing element 105, it may be possible to quantify or otherwise estimate the distance 315 between the object 120 and the surface 310 of the sensing element 105.

In various embodiments, the capacitive sensor 100 may detect when Vout reaches and/or exceeds a predetermined threshold. For example, and referring to FIG. 4, the capacitive sensor 100 may respond to a first predetermined threshold 405 and respond again to a second predetermined threshold 410. The capacitive sensor 100 may transmit a signal to a controller (not shown) when Vout reaches one of the predetermined thresholds to trigger an output circuit (not shown) to switch states between ON and OFF, which may indicate some input selection of an electronic device, such as a cellular phone.

The sensing element 105 may produce the sensing field 125 and respond to objects entering and/or within the sensing field 125. The sensing element 105 may comprise any suitable device or system responsive to the sensing field 125. The sensing element 105 may comprise input devices, such as buttons, switches, dials, sliders, keys or keypads, navigation pads, touch pads, touch screens, and the like. The sensing element 105 may be formed within an insulation substrate (not shown), such as a PCB substrate in an electronic device, such as a cellular phone, personal computer, and the like. For example, and referring to FIGS. 3, 8, 12, and 13, in various embodiments, the sensing element 105 may comprise a plurality of electrodes 135 suitably configured to form the sensing field 125. In various embodiments, at least one electrode 135 may comprise a drive electrode 110 (i.e., a transmission electrode) and at least one electrode 135 may comprise a reception electrode 115, wherein the transmission electrode 110 and the reception electrode 115 form a sensing capacitor Cs, having a capacitance value CA1. The electrodes 135 may have any physical arrangement and may be formed of any shape or size for a particular application.

Figure 3:
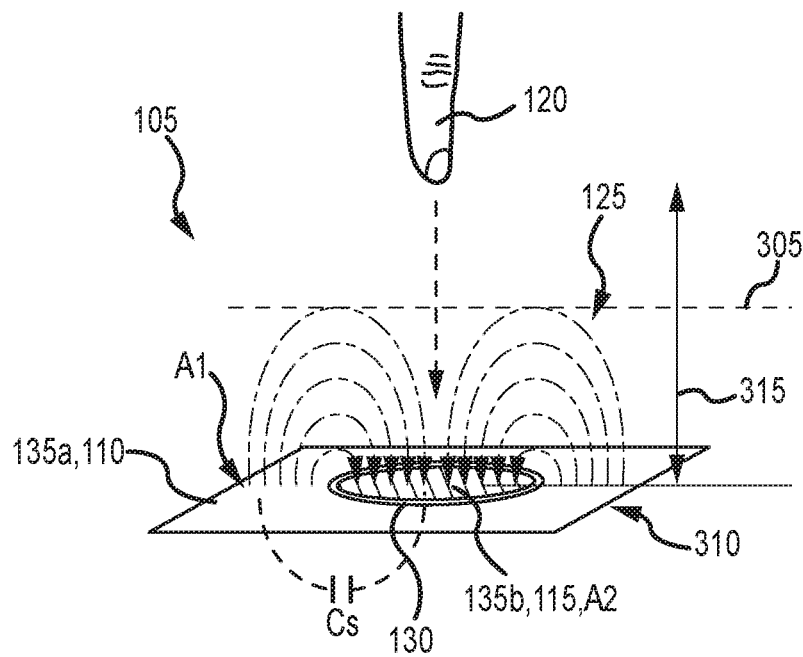
FIG. 3 representatively illustrates a capacitive proximity sensor in accordance with an exemplary embodiment of the present technology.
Figure 4:
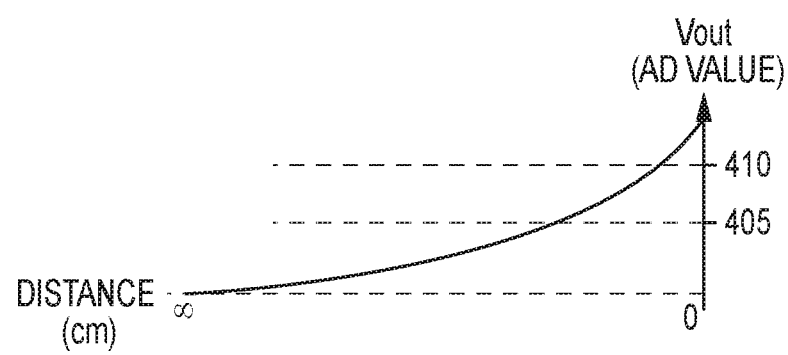
FIG. 4 graphically illustrates a relationship between distance from a sensing surface and output voltage of a capacitive proximity sensor in accordance with an exemplary embodiment of the present technology.
Figure 5:
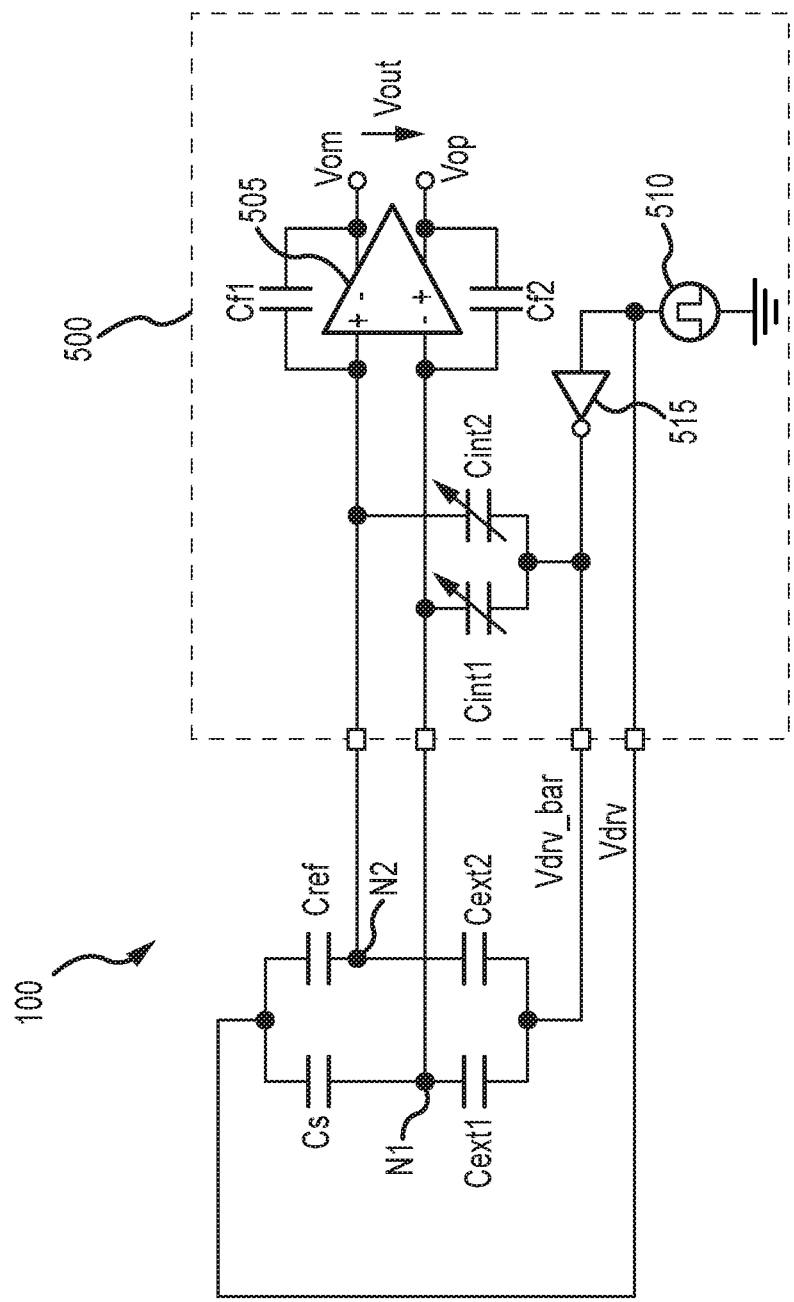
FIG. 5 is an equivalent circuit diagram of a capacitive proximity sensor in accordance with an exemplary embodiment of the present technology.

Referring to FIG. 3, in an exemplary embodiment, the sensing element 105 comprises a first electrode 135a and a second electrode 135b, wherein the first and second electrodes 135a, 135b may be coplanar. In the present embodiment, the first electrode 135a may comprise the transmission electrode 110 and the second electrode 135b may comprise the reception electrode 115, wherein the first and second electrodes 135a, 135b together form the sensing capacitor Cs. For example, the sensing element 105 may comprise a total surface area A, wherein the first electrode 135a may comprise a first surface area A1 defined generally by the dimensions of the surface 310 of the sensing element 105. The second electrode 135b may comprise a second surface area A2 that is surrounded by the first electrode 135a and separated by a dielectric 130, wherein the dielectric surrounds the second electrode 135b. The reception electrode 115 may be coupled to a voltage source 510 (FIG. 5).

Figure 8:
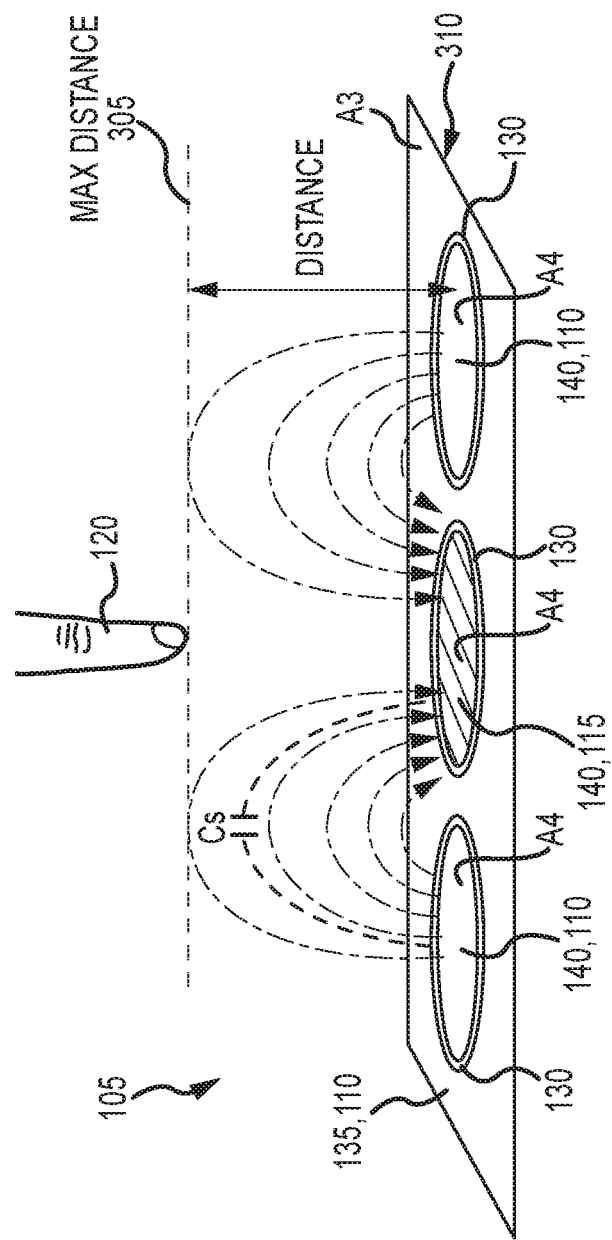
FIG. 8 representatively illustrates a capacitive proximity sensor in accordance with an exemplary embodiment of the present technology.

Referring to FIG. 8, in an alternative embodiment, the sensing element 105 may comprise a plurality of electrodes suitably configured to produce the sensing field 125. In the present embodiment, the sensing element 105 may comprise the electrode 135 configured to operate as the transmission electrode 110 (i.e., a single-operation electrode). The sensing element 105 further comprises a plurality of multi-operation electrodes 140 suitably configured to operate as the transmission electrode 110 and the reception electrode 115. For example, only one multi-operation electrode 140 may operate as the reception electrode 115, while the remaining multi-operation electrodes 140 operate as transmission electrodes 110. As such, the multi-operation electrode 140 operating as the reception electrode 115 and the remaining electrodes operating as the transmission electrodes 110, form the sensing capacitor Cs.

The multi-operation electrodes may be coplanar with the electrode 135 wherein the plurality of multi-operation electrodes 140 are nested inside and surrounded by the electrode 135. The dielectric 130 may surround each multi-operation electrode 140 to insulate them from the electrode 135. In an exemplary embodiment, the multi-operation electrodes 140 are aligned along one direction and substantially equidistant from one another. In alternative embodiments, the multi-operation electrodes 140 may be aligned vertically and horizontally to form an array.

The sensing field 125 may exhibit increased sensitivity above the surface 310 of the sensing element 105, as well as in a lateral direction from the multi-operation electrode 140 operating as the reception electrode 115. In the present embodiment, the electrode 135, may comprise a third surface area A3, and each multi-operation electrode 140 may comprise a fourth surface area A4, wherein the fourth surface areas A4 are equal.

Referring to FIGS. 9 and 12 through 18, in an alternative embodiment, the capacitive sensor 100 may be configured to detect volume, a position of an object in a 3-dimensional space, the presence or absence of an object in the 3-dimensional space, and other characteristics of the 3-dimensional space. For example, the sensing element 105 of the capacitive sensor 100 may be arranged on multiple planes to form a sensing region in the space created by the planes. Each plane may be suitably configured to operate as the transmission electrode 110 or the reception electrode 115 according to a desired function or application.

Figure 12A:
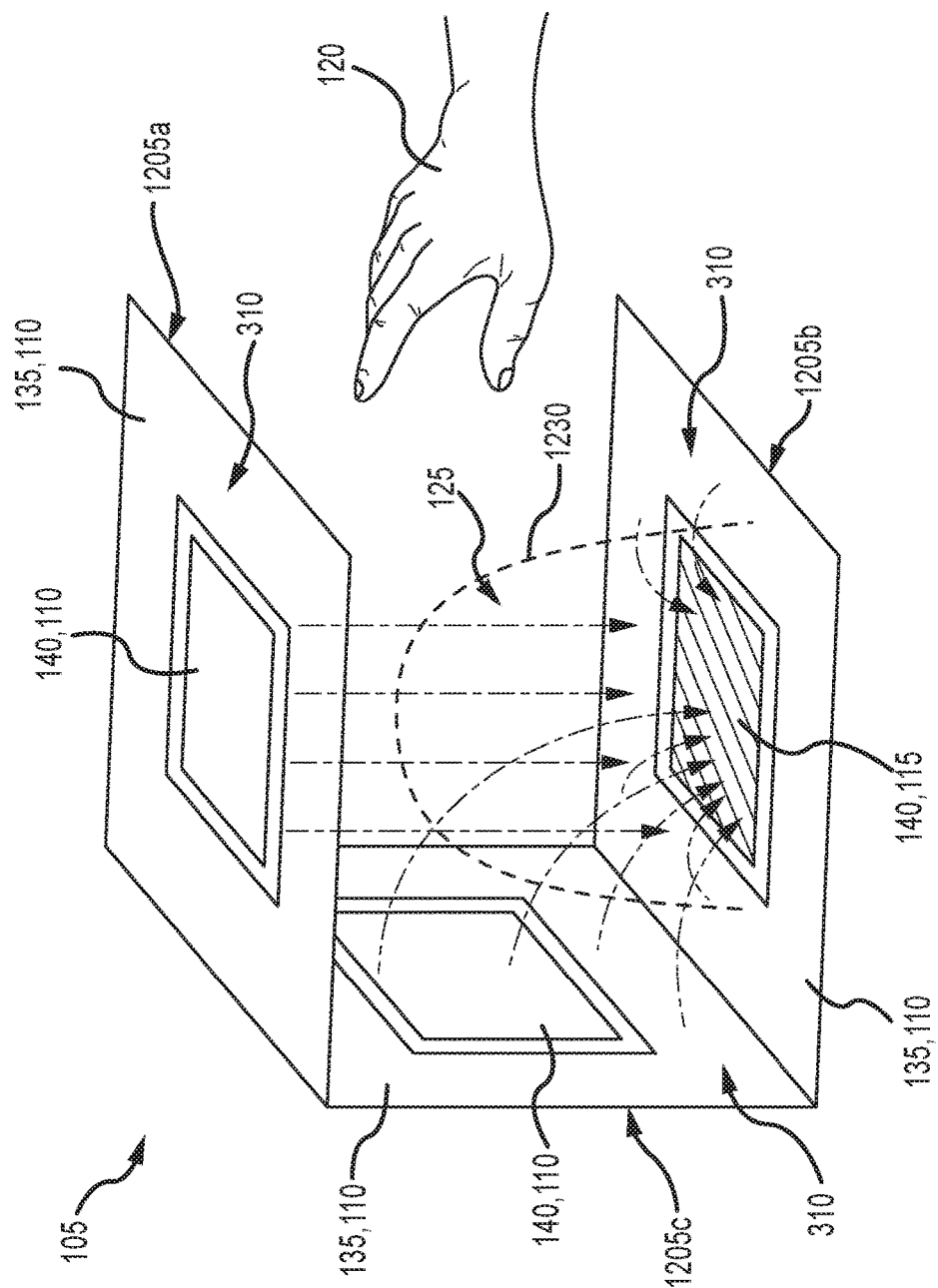
FIGS. 12A-C representatively illustrate a multi-plane capacitive proximity sensor in accordance with an exemplary embodiment of the present technology.
Figure 12B:
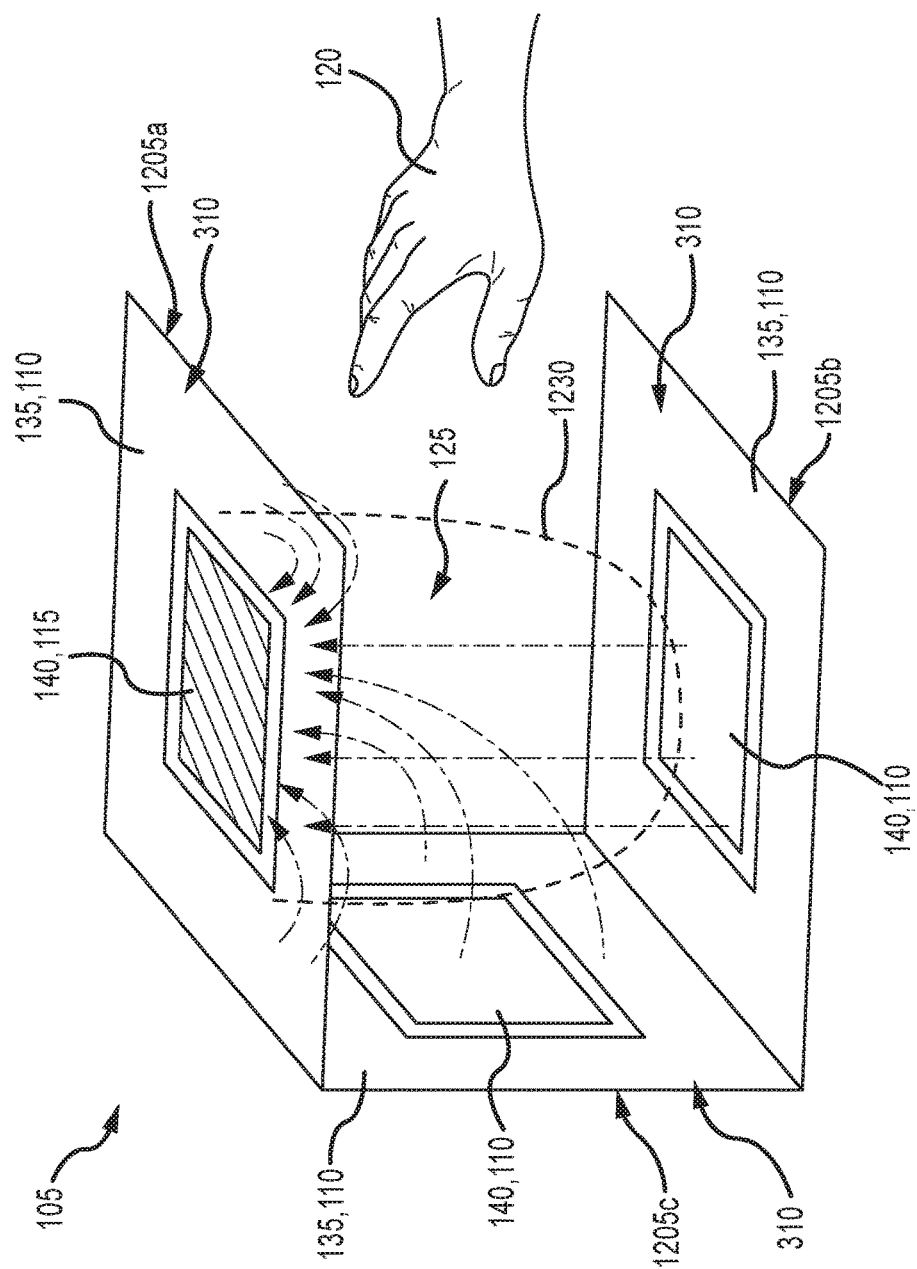
Figure 12C:
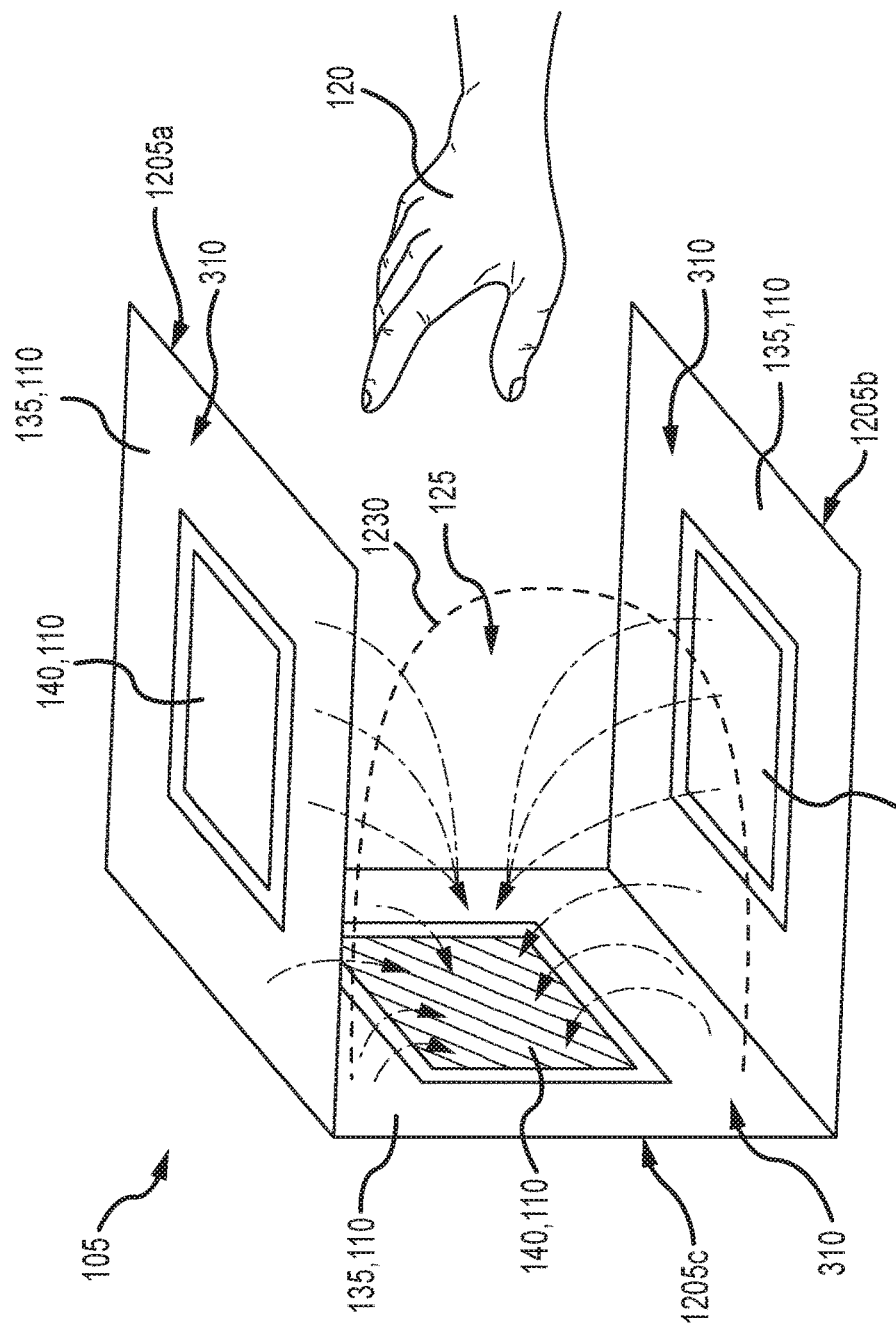

Referring specifically to FIGS. 12A-C, the sensing element 105 may comprise three surfaces 310 arranged along a first plane 1205a, a second plane 1205b, and a third plane 1205c. The first plane 1205a and the second plane 1205b may be positioned substantially parallel to each other and the third plane 1205c may be positioned orthogonally between the first and second planes 1205a, 1205b. Each surface 310 may comprise two electrodes, wherein one of the electrodes comprises a multi-operation electrode 140 surrounded by a larger electrode 135. As described above, the multi-operation electrode 140 may operate as the transmission electrode 110 and/or the reception electrode 115. The two multi-operation electrodes 140 on the set of parallel planes, for example the first and second planes 1205a, 1205b, may be at least substantially aligned with each other, wherein the first plane 1205a is positioned directly across from the second plane 1205b.

At any given time, only one of the multi-operation electrodes 140 operates as the reception electrode 115 and the remaining multi-operation electrodes 140 operate as the transmission electrodes 110. As such, the sensing capacitor Cs is formed between the multi-operation electrode 140 operating as the reception electrode 115 and the remaining electrodes operating as the transmission electrodes 110.

The sensing element 105 may form a plurality of sensing fields 125 based on the operation of the multi-operation electrodes 140 to create a region 1230 with higher sensitivity. For example, the region 1230 of higher sensitivity may comprise a subspace proximate to the multi-operation electrode 140 that is operating as the reception electrode 115.

Figure 13:
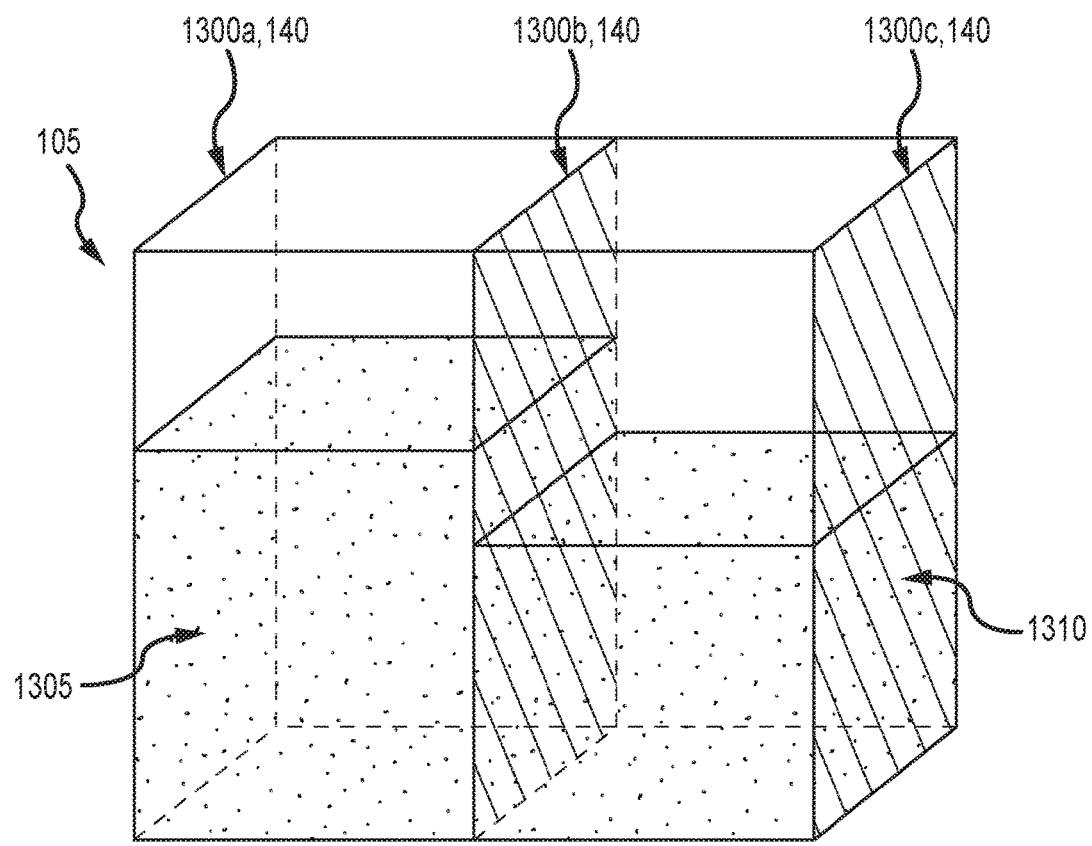
FIG. 13 representatively illustrates a multi-plane capacitive sensor in accordance with an exemplary embodiment of the present technology.
Figure 14:
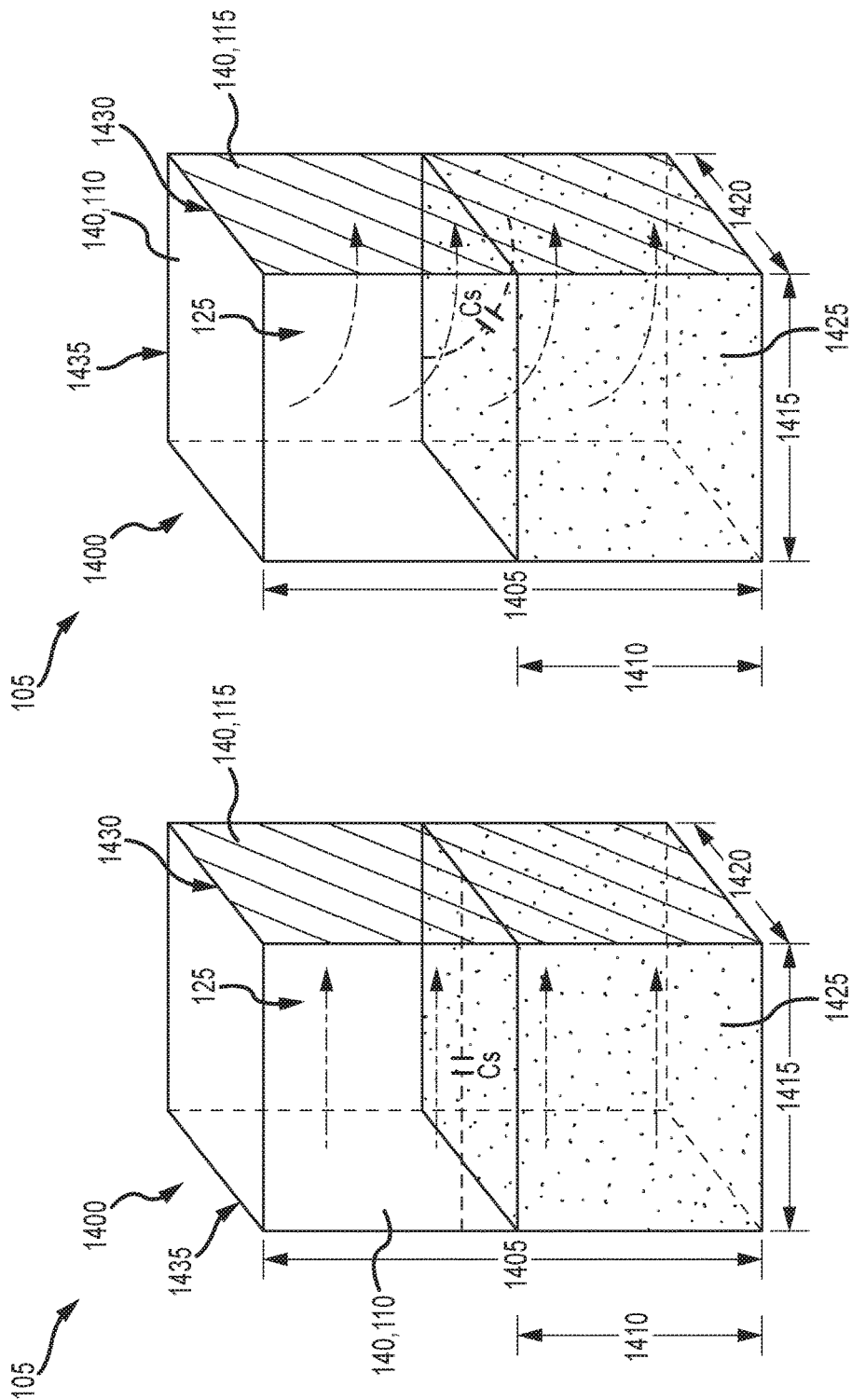
FIGS. 14A-B representatively illustrate a capacitive sensor in accordance with an exemplary embodiment of the present technology.
Figure 15:
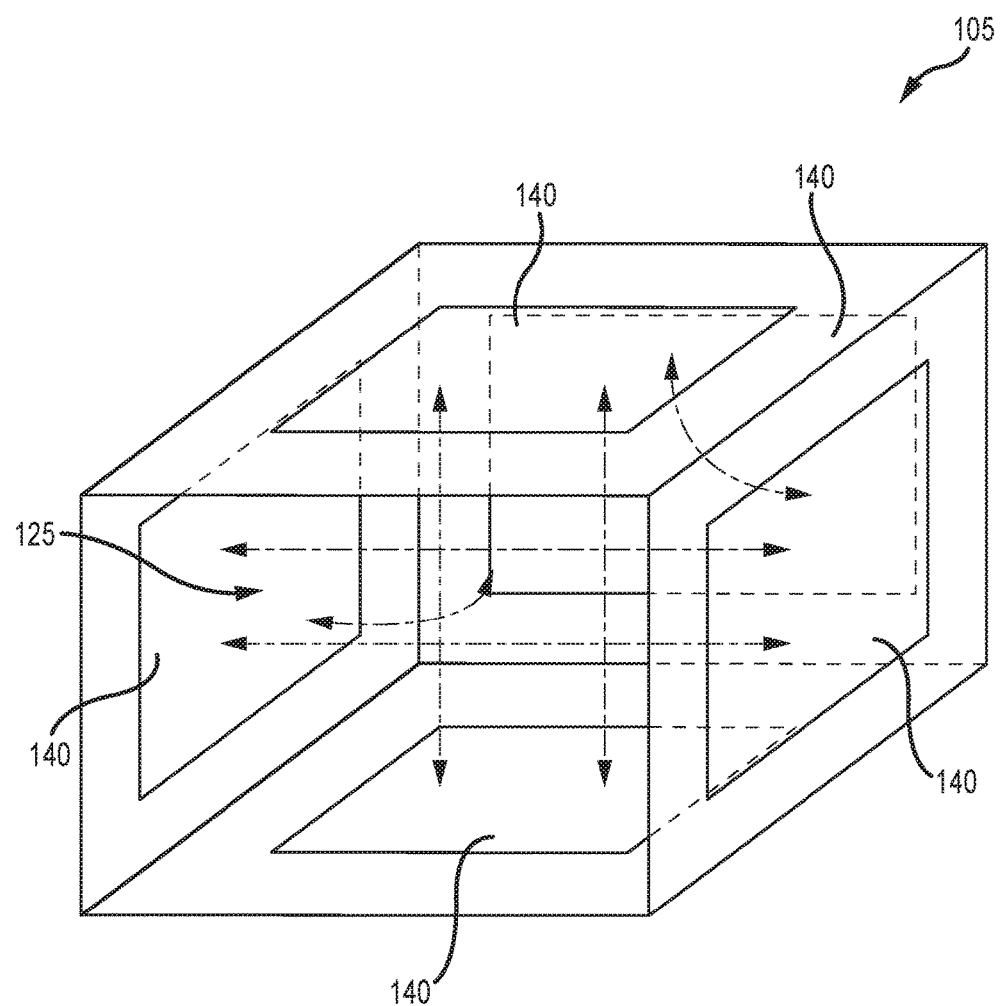
FIG. 15 representatively illustrates a 3-dimensional capacitive sensor in accordance with an exemplary embodiment of the present technology.
Figure 16:
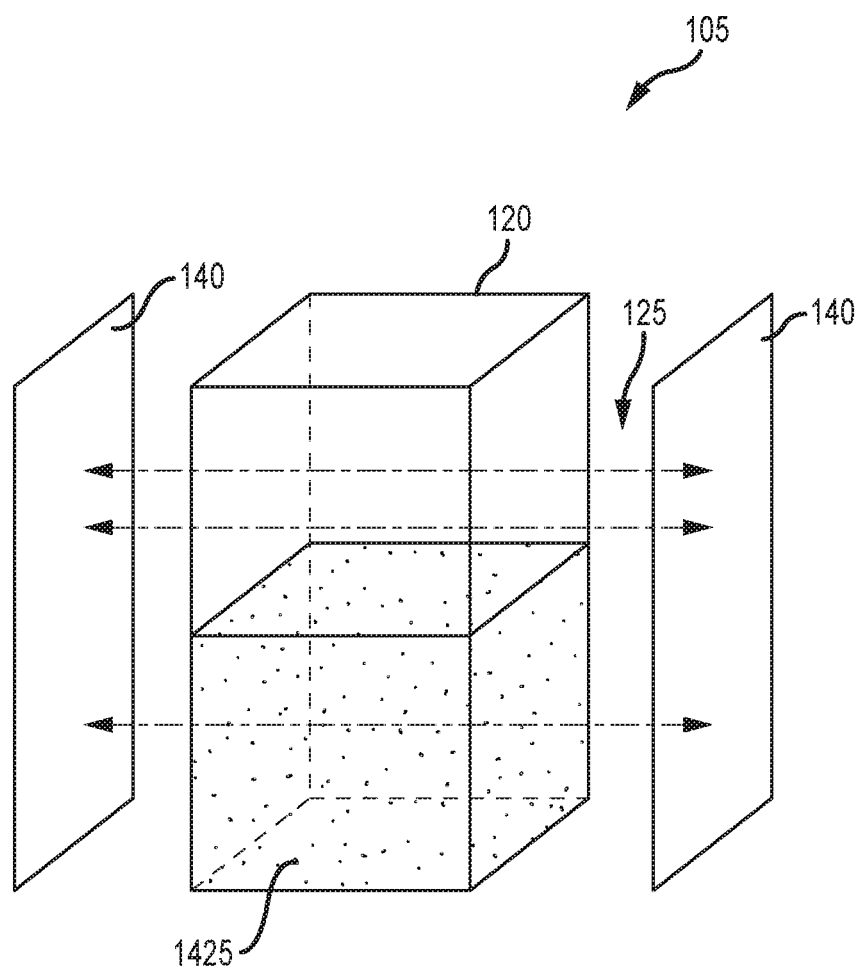
FIG. 16 representatively illustrates a 3-dimensional capacitive sensor in accordance with an exemplary embodiment of the present technology.
Figure 17:
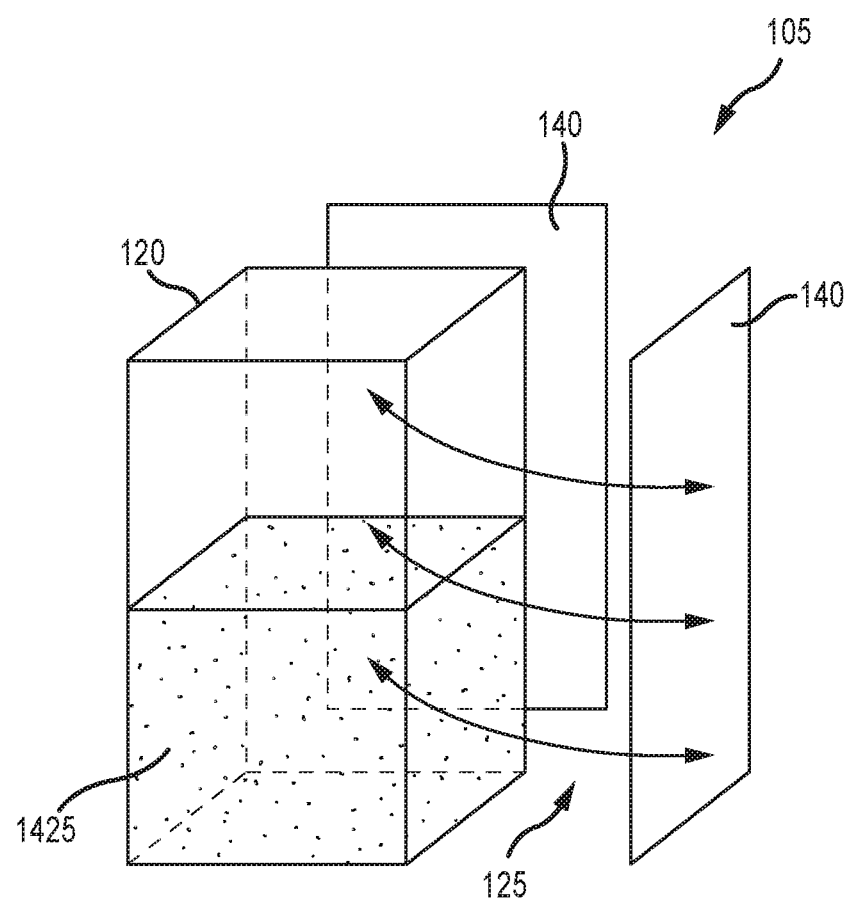
FIG. 17 representatively illustrates a 3-dimensional capacitive sensor in accordance with an exemplary embodiment of the present technology.
Figure 18:
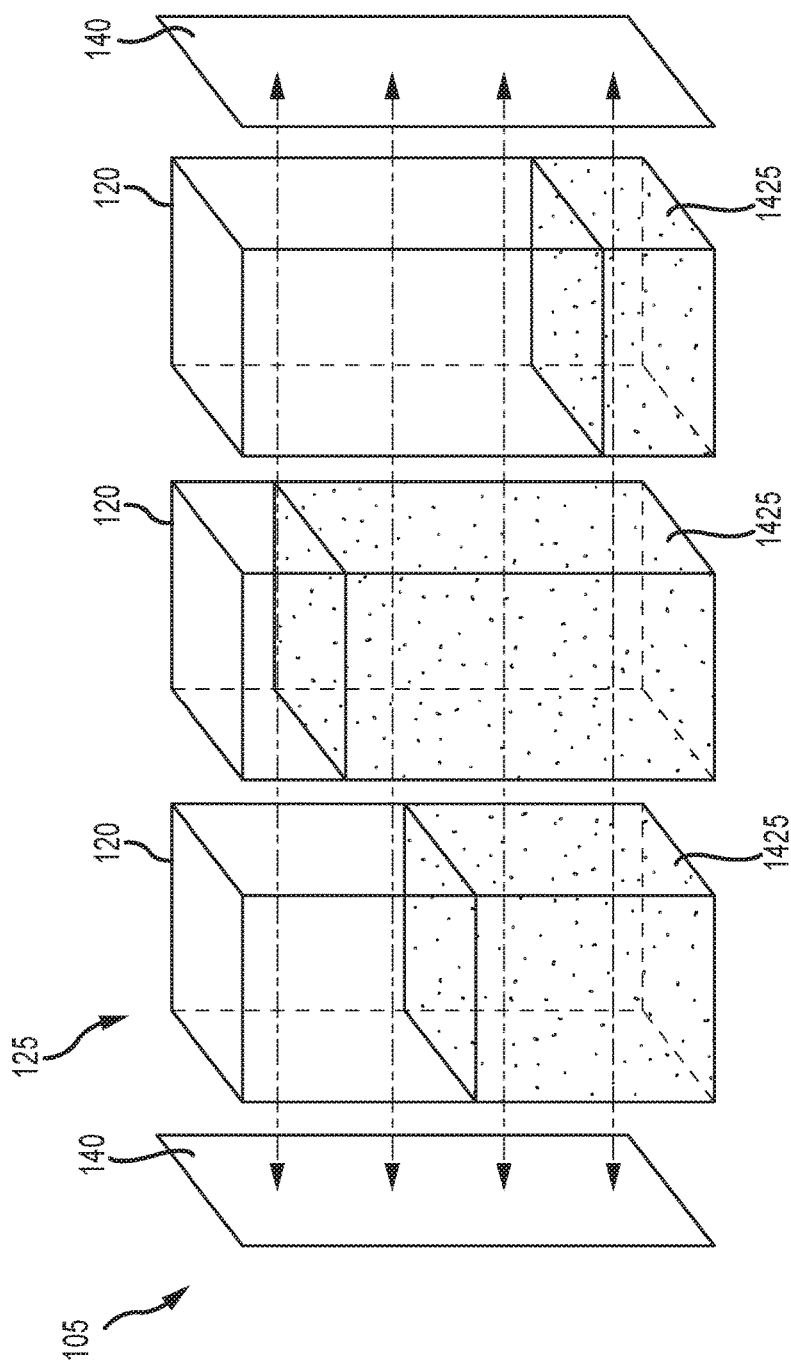
FIG. 18 representatively illustrates a 3-dimensional capacitive sensor in accordance with an exemplary embodiment of the present technology.

In a third embodiment, and referring to FIG. 13, the sensing element 105 may be arranged along parallel planes to measure the capacitance between the two planes. For example, the sensing element 105 may comprise a first plane 1300a spaced a predetermined distance from a second plane 1300b. The sensing element 105 may further be configured to measure the capacitance between more than two planes by comprising a third plane 1300c spaced a second predetermined distance from the second plane 1300b. Each plane may be configured to operate as the transmission electrode 110 and/or or the reception electrode 115 (i.e., the multi-operation electrode 140). In various embodiments, each plane 1300 may also operate as a high impedance electrode. According to the present embodiment, each plane 1300 may have substantially equal areas and the electrodes 140 may be aligned.

In yet another alternative embodiment of the capacitive sensor 100, and referring to FIGS. 14A-B, the sensing element 105 may be arranged on multiple planes of a 3-dimensional container 1400. For example, two or more sides of the container 1400 comprise the multi-operation electrode 140 to form the sensing field 125, wherein a first side 1430 operates as the reception electrode 115 and a second side 1435 operates as the transmission electrode 110. Each multi-operation electrode 140 may be configured operate as the reception electrode 115 and the transmission electrode 110, as described above.

According to various embodiments, operation of the multi-operation electrodes 140 may be sequenced, wherein at any given time, only one multi-operation electrode 140 is operating as the reception electrode 115 and one electrode 140 is operating as the transmission electrode 110. For example, as shown in FIG. 14A, the multi-operation electrodes 140 may be arranged on opposing sides of the container 1400 to create a horizontal sensing field 125 and to form the sensing capacitor Cs. Alternatively, and as shown in FIG. 14B, the transmission electrode 110 and the reception electrode 115 may be arranged on non-parallel sides of the container 1400 to create a curved sensing field 125 and to form the sensing capacitor Cs.

The container 1400 may have predetermined dimensions comprising a height 1405, a width 1415, and a length 1420. As such, the container 1400 may have a maximum volume, equal to a product of the height 1405, the width 1415, and the length 1420 (i.e. volume=height×width×length). The container 1400 may be filled with a material 1425, such as a liquid with a predetermined dielectric constant, to a level 1410. The volume of the material 1425 may then be computed based on the container dimensions, capacitance data, and dielectric constant.

The particular arrangement of the sensing element 105 may be adapted according to a desired function or application. For example, and referring to FIG. 15, the sensing element 105 may comprise multi-operation electrodes 140 formed on more than three planes. In another arrangement, referring to FIGS. 16 and 18 the sensing element 105 may comprise two parallel electrodes 140 spaced a predetermined distance apart and able to accommodate one or more objects to be place between the electrodes 140. In yet another arrangement, referring to FIG. 17, the electrodes 140 may be disposed in a non-parallel position from each other.

Referring to FIGS. 5, 6, 7, 9 the capacitive sensor 105 may comprise a detection circuit 500 coupled to the sensing element 105 to detect changes in the capacitance of the sensing capacitor Cs. The detection circuit 500 may comprise any suitable system or method for sensing changes in capacitance.

The detection circuit 500 may be configured to have a preset internal capacitance or a variable internal capacitance. For example, in one embodiment, the detection circuit may comprise a first internal variable capacitor Cint1 with an adjustable capacitance CAint1 and a second internal variable capacitor Cint2 with an adjustable capacitance CAint2. As such, the detection circuit 500 will have a potential internal maximum capacitance value CAmax defined as the capacitance value when the first and second internal variable capacitors Cint1, Cint2 are adjusted to their maximum values. Similarly, the detection circuit will have a potential minimum capacitance value CAmin defined as the capacitance value when the first and second internal variable capacitors Cint1, Cint2 are adjusted to their minimum values. In general, a total internal IC capacitance CAint_total may be defined as the capacitance of the first internal capacitor CAint1 plus the capacitance of the second internal capacitor CAint2 (i.e., CAint_total=CAint1+CAint2).

The first internal variable capacitor Cint1 may be electrically connected to a voltage source, for example an inverted driving voltage pulse Vdrv_bar (by using an inverter 515 to invert the voltage source 510) and the inverting input terminal (−) of the differential amplifier 505. The second internal variable capacitor Cint2 may be electrically connected to the inverted driving voltage pulse Vdrv_bar and the non-inverting input terminal (+) of the differential amplifier 505.

A surface area of the sensing element 105 may be increased, thereby increasing the sensitivity of the sensing element 105 by increasing the strength of the sensing field 125, and increasing the maximum distance 305 at which the capacitive sensor 100 may detect an object approaching the sensing element 105. In various embodiments, the detection circuit 500 may accommodate multiple sensing capacitors Cs. In various embodiments, the capacitive sensor 100 may be able to accommodate a sensing element 105 with a capacitance which is larger than the internal capacitance of the IC.

In general, a ratio of the sensing capacitance CA1 to the first internal variable capacitance CAint1 is equal to the ratio of the reference capacitance CAref to the second internal variable capacitance CAint2 (i.e., CA1:CAint1=CAref:CAint2). Therefore, a maximum detection capacitance Cdet_max, which is defined as the sum of the maximum capacitance values of the first and second internal capacitors Cint1, Cint2, is limited by the maximum capacitance values of the first and second internal capacitors Cint1, Cint2. In some cases, the capacitance CA1 of the sensing capacitor Cs may exceed the maximum capacitance of the first internal variable capacitor Cint1 and the IC will not be able to accurately detect the capacitance CA1 of the sensing capacitor Cs.

The detection capabilities of the IC may be improved by coupling additional external (outside of the IC) capacitors coupled to the first and second variable capacitors Cint1, Cint2. In this case, the capacitive sensor 100 will have an effective detection capacitance Cdet_eff, wherein the effective detection capacitance Cdet_eff has a maximum value equal to the capacitance of the additional external capacitors CAext1, CAext2 plus the potential internal maximum capacitance of the first and second variable capacitors CAmax. By increasing the effective detection capacitance Cdet_eff of the capacitive sensor 100, the surface area A of the sensing element 105 may be increased while maintaining the internal capacitance of the IC. Since capacitance and area are proportional, increasing the surface area A of the sensing element 105 increases the capacitance of the sensing capacitor Cs, and in turn increases the maximum distance 305 of the sensing field 125.

Referring to FIG. 5, in an exemplary embodiment, the capacitive sensor 100 may comprise additional external capacitors to improve the detection capability of the capacitive sensor 100. In the present embodiment, the capacitive sensor 100 comprises the sensing capacitor Cs, the reference capacitor Cref, a first external capacitor Cext1 with a capacitance CAext1, and a second external capacitor Cext2 with a capacitance CAext2. As discussed above, the first and second external capacitors Cext1, Cext2 are formed outside of the IC.

In an exemplary embodiment, the first external capacitor Cext1 is coupled in parallel with the first internal variable capacitor Cint1, and the second external capacitor Cext2 is coupled in parallel with the second internal variable capacitor Cint2. Since capacitors coupled in parallel are summed, the total capacitance for each pair is the capacitance of the external capacitor plus the capacitance of the internal capacitor.

The sensing capacitor Cs may be electrically connected in series with the first external capacitor Cext1 and the first internal variable capacitor Cint1, at a first node N1. The first node N1 may be coupled to an inverting input terminal (−) of a differential amplifier 505. The inverting input terminal (−) of the differential amplifier 505 may receive a signal comprising first capacitance data.

The reference capacitor Cref may be electrically connected in series with the second external capacitor Cext2 and the second internal variable capacitor Cint2 at a second node N2. The second node N2 may be coupled to a non-inverting input terminal (+) of the differential amplifier 505. The non-inverting input terminal (+) of the differential amplifier 505 may receive a signal comprising second capacitance data.

The detection circuit 500 may further comprise a first feedback capacitor Cf1 and a second feedback capacitor Cf2. The first feedback capacitor Cf1 may be electrically connected between a first output terminal (−) and the non-inverting input terminal (+) of the differential amplifier 505, and the second feedback capacitor Cf2 may be electrically connected between a second output terminal (+) and the inverting input terminal (−) of the differential amplifier 505. The first and second feedback capacitors Cf1, Cf2 may have the same capacitance.

In various embodiments, the detection circuit 500 may provide an output voltage Vout that corresponds to a difference between the first capacitance data and the second capacitance data. The output voltage Vout may be defined as the difference between an output voltage Vom from the inverting output terminal (−) of the differential amplifier 505 and an output voltage Vop from the non-inverting output terminal (+) of the differential amplifier 505 (Vout=Vop−Vom).

Figure 6:
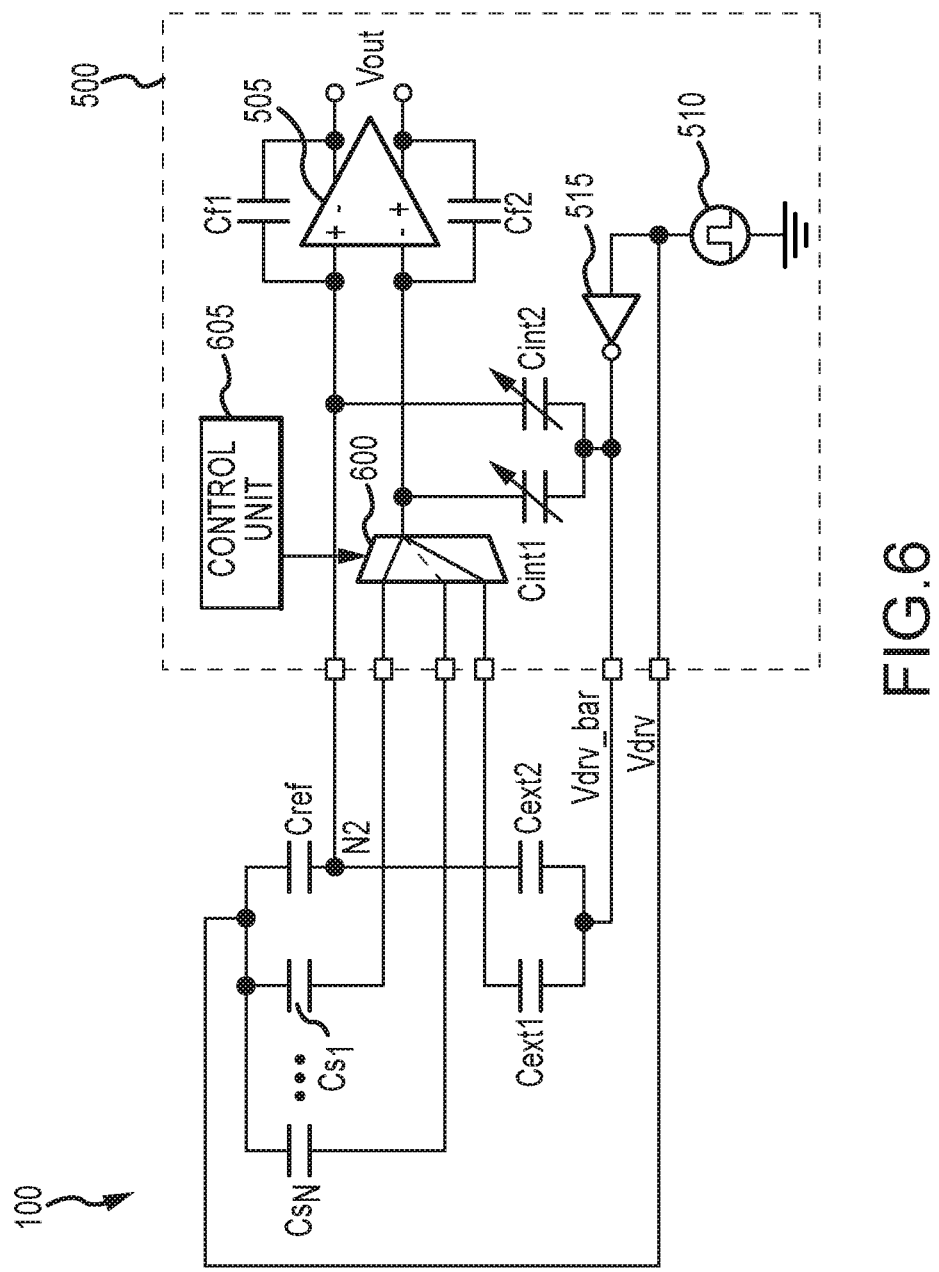
FIG. 6 is an equivalent circuit diagram of a capacitive proximity sensor in accordance with an exemplary embodiment of the present technology.

Referring to FIG. 6, in an alternative embodiment, the detection circuit 500 may be modified to accommodate a plurality of sensing capacitors Cs. In various embodiments, the detection circuit 500 comprises a first multiplexer (MUX) 600 coupled to a control unit 605. Various input signals of the first MUX 600 may be selectively activated by the control unit 605, wherein the selected input signal is transmitted to the differential amplifier 505

The first MUX 600 may be electrically connected to a plurality of sensing capacitors Cs, as well as the first external capacitor Cint1. As such, the capacitance data transmitted to the differential amplifier 505 may comprise any combination of the capacitance of any sensing capacitor Cs and the first external capacitor Cext1.

Figure 7:
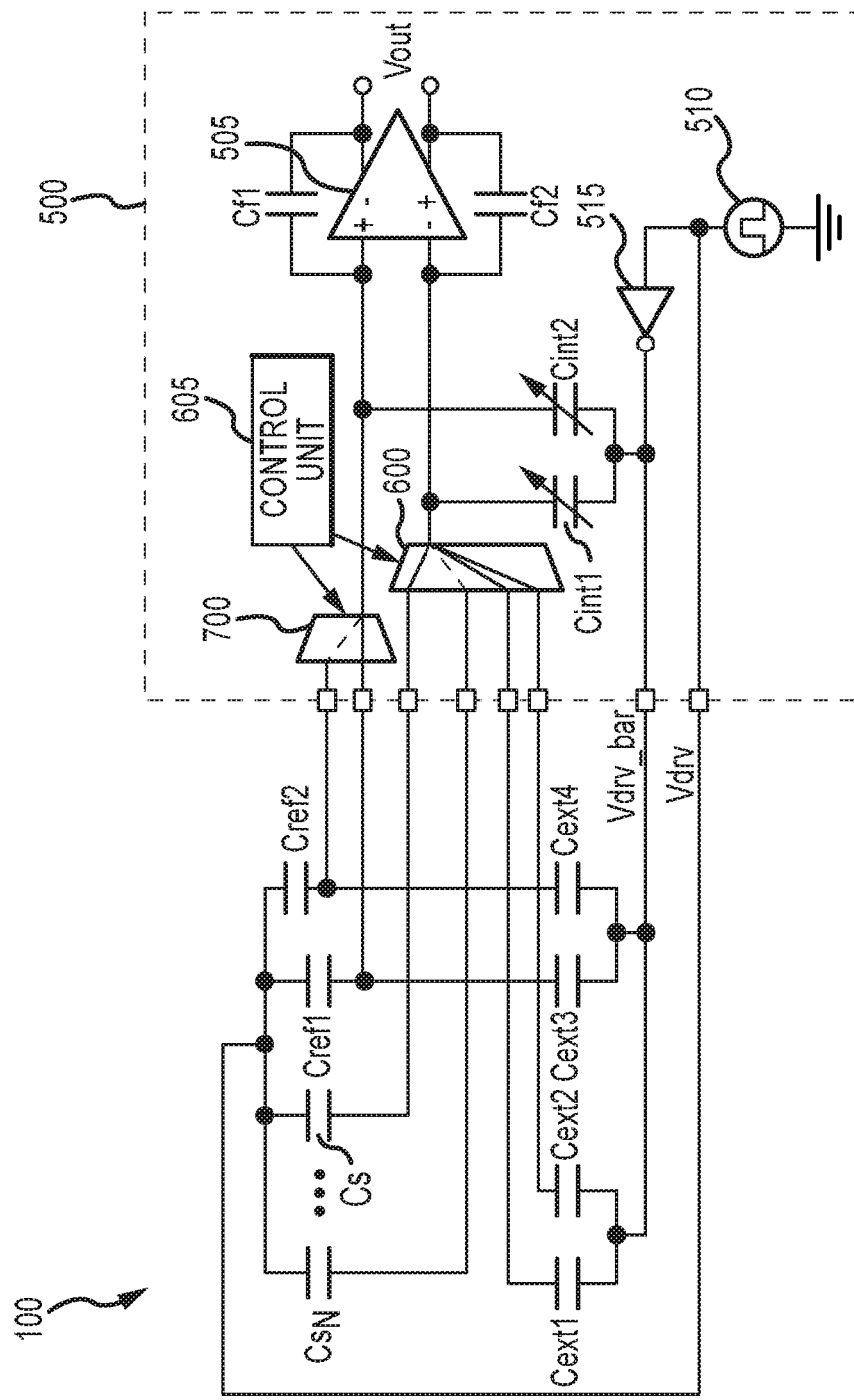
FIG. 7 is an equivalent circuit diagram of a capacitive proximity sensor in accordance with an exemplary embodiment of the present technology.

Referring to FIG. 7, in yet another alternative embodiment, the detection circuit 500 may be modified to accommodate grouped sensing capacitors Cs. In the present embodiment, the capacitive sensor 100 comprises a plurality of sensing capacitors $Cs:Cs_N$, a first reference capacitor Cref1, a second reference capacitor Cref2, first and second external capacitors Cext1, Cext2, a third external capacitor Cext3, and a fourth external capacitor Cext4.

In the present embodiment, the detection circuit 500 may comprise the first MUX 600, wherein the first MUX 600 is coupled to the plurality of sensing capacitors $Cs:Cs_N$ and the first and second external capacitors Cext1, Cext2. In the present embodiment, the detection circuit 500 may further comprise a second MUX 700, wherein the second MUX 700 is coupled to the first and second reference capacitors Cref1, Cref2 and the third and fourth external capacitors Cext3, Cext4.

In various embodiments, the first and second MUX 600, 700 may receive control signals from the control unit 605 to selectively transmit one or more input signals to the differential amplifier 505. In the present embodiment, the first MUX 600 may selectively couple a group of sensing capacitors Cs to the first external capacitor Cext1 and/or the second external capacitor Cext2. For example, if there are eight (8)

sensing capacitors Cs (i.e., capacitors $Cs_1:Cs_8$) with capacitance values CA1:CA8, the sensing capacitors Cs may be split into two groups: a first group comprising capacitors $Cs_1:Cs_4$ and a second group comprising capacitors $Cs_5:Cs_8$. The first group may be coupled with the first external capacitor Cext1, while the second group may be coupled with the first and second external capacitors Cext1, Cext2. In alternative embodiments, the plurality of sensing capacitors Cs may be grouped into three groups. As such, fifth and sixth external capacitors may be added.

In general, for each group of sensing capacitors (i.e., $Cs_1:Cs_N$), the detection circuit 500 is capable of detecting a range of sensing capacitance values, the range comprising a maximum capacitance value CAmax_sense and a minimum capacitance value CAmin_sense. The maximum capacitance value CAmax_sense is equal to a maximum capacitance value of the first internal variable capacitor CAint1_max plus an external capacitance CAext (i.e., CAmax_sense=CAint1_max+CAext). Similarly, the minimum capacitance value CAmin_sense is equal to a minimum capacitance value of the first internal variable capacitor CAint1_min plus an external capacitance CAext (i.e., CAmin_sense=CAint1_min+CAext). For example, if the capacitance CAint1 of the first variable internal capacitor Cint1 ranges from 0 pF to 8 pF, and there are 16 sensing capacitors Cs with capacitance values: 5 pF, 6 pF, 7 pF, 8 pF, 9 pF, 10 pF, 11 pF, 12 pF, 13 pF, 14 pF, 15 pF, 16 pF, 17 pF, 18 pF, 19 pF, 20 pF, and the first external capacitance CAext1 is 5 pF, the detection circuit 500 is able to detect capacitance values from 5 pF to 13 pF. Similarly, if the first external capacitance CAint1 is 12 pF, the detection circuit 500 is able to detect capacitance values from 12 pF to 20 pF. The detection circuit 500 can only detect the sensing capacitors with capacitance values that do not exceed the maximum value CAmax_sense. If the capacitance value exceeds the range set forth above, then the detection circuit 500 will not activate. As such, various external capacitors coupled as inputs to the first and second MUX may be selected accordingly to increase the maximum capacitance value Cmax_sense.

According to various embodiments of the present technology, the effective detection capacitance Cdet_eff of the IC is increased by connecting external capacitors Cint1 and Cint2 in parallel with the internal variable capacitors Cext1, Cext2, respectively. As such, the effective detection capacitance Cdet_eff is greater than the total internal capacitance Cint_total. This arrangement allows greater detection capabilities without increasing the total internal maximum capacitance Cint_total of the IC. For example, in a conventional sensor, if the first internal variable capacitor Cint1 has a maximum capacitance of 8 pF and the sensing capacitor Cs has a capacitance of 50 pF, the first internal variable capacitor Cint1 is not able to adjust to match the sensing capacitor Cs. In various embodiments of the present technology, for example, adding the first external capacitor Cext1 with a capacitance of 45 pF provides an effective detection capacitance Cdet_eff of 50 pF that is capable of detecting the capacitance of the sensing capacitor Cs.

According to various embodiments, the detection circuit 500 operates to ensure that the capacitive sensor 100 maintains a particular capacitance ratio to improve the accuracy of the output data. The capacitance ratio is optimized when the ratio of the sensing capacitor Cs to the reference capacitor Cref is equal to the ratio of the effective internal capacitance (i.e., [Cs:(Cext1+Cint1)]=[Cref:(Cext2+Cint2)].

Figure 9:
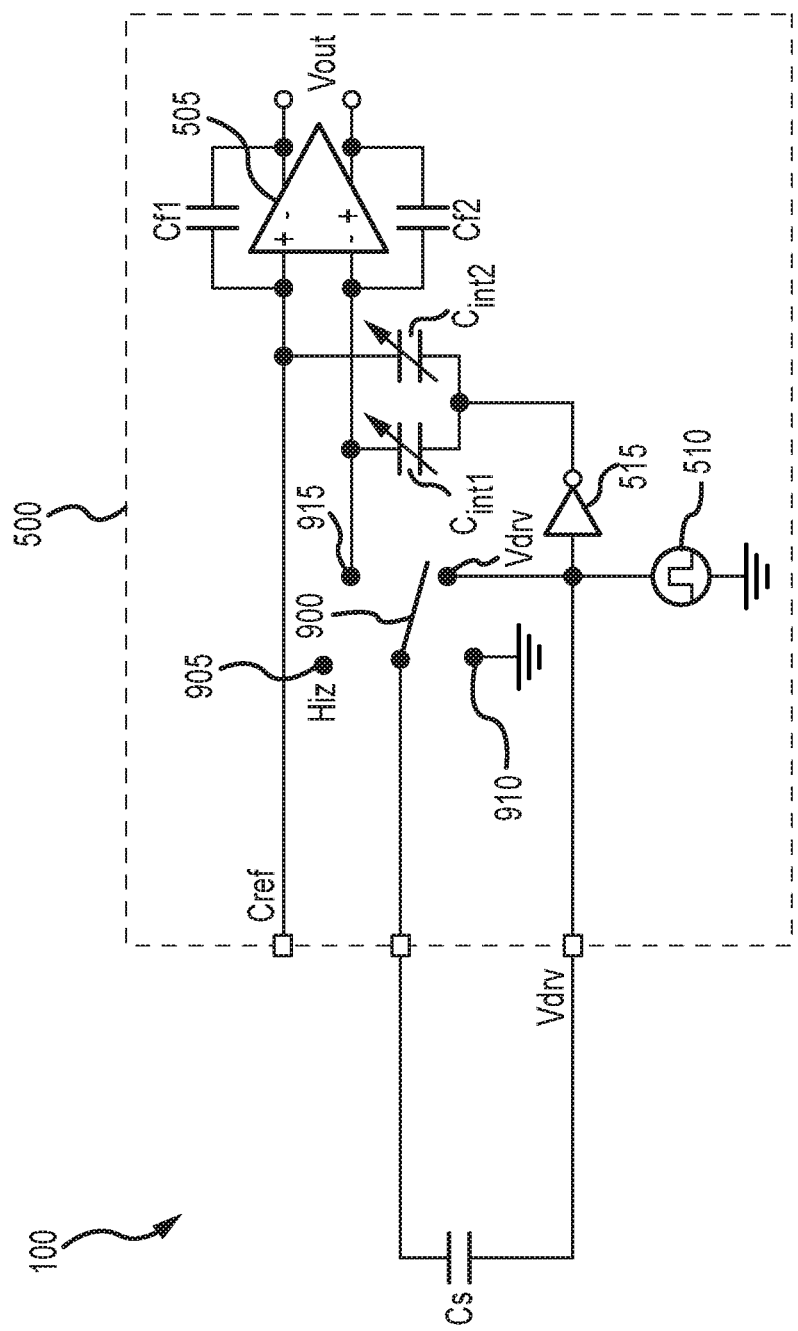
FIG. 9 is an equivalent circuit diagram of a capacitive proximity sensor in accordance with an exemplary embodiment of the present technology.
Figure 10:
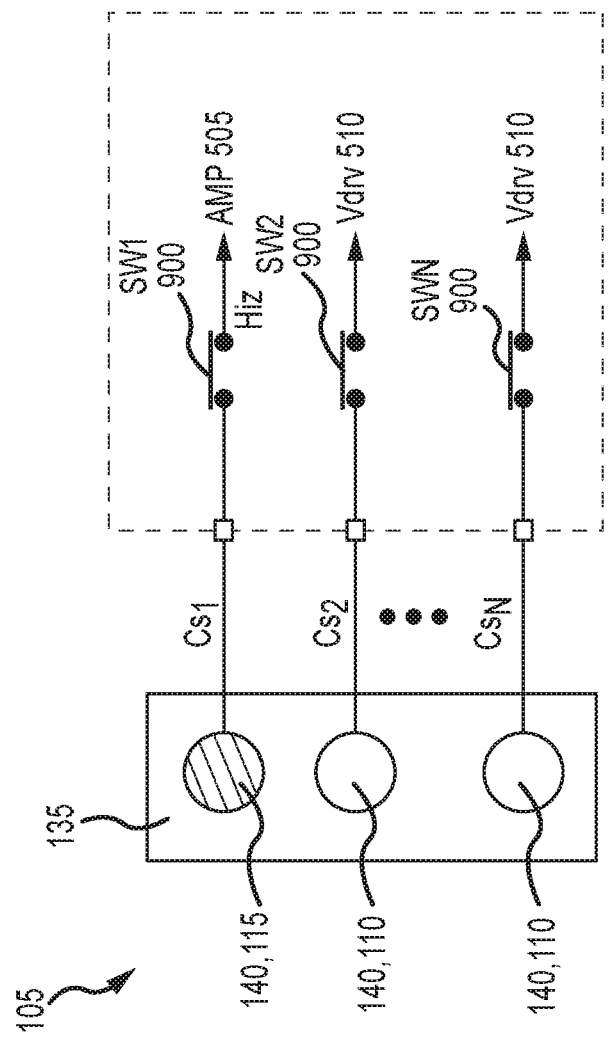
FIG. 10 is a partial circuit diagram of a capacitive proximity sensor in accordance with an exemplary embodiment of the present technology.
Figure 11A:
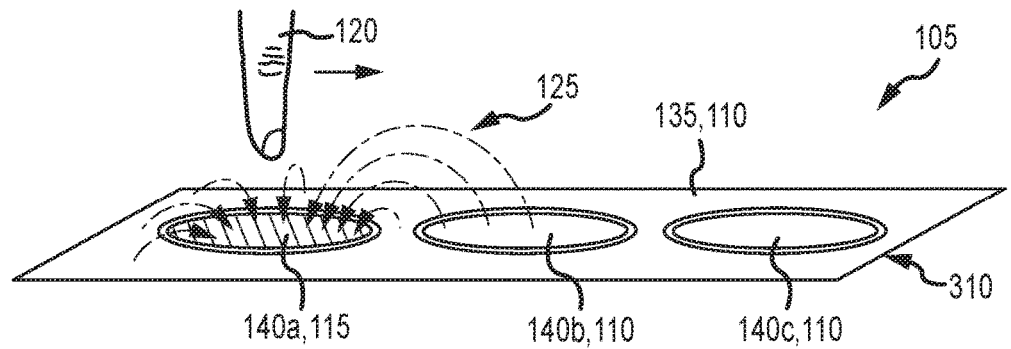
FIGS. 11A-C representatively illustrates operation of a capacitive proximity sensor in accordance with an exemplary embodiment of the present technology.
Figure 11B:
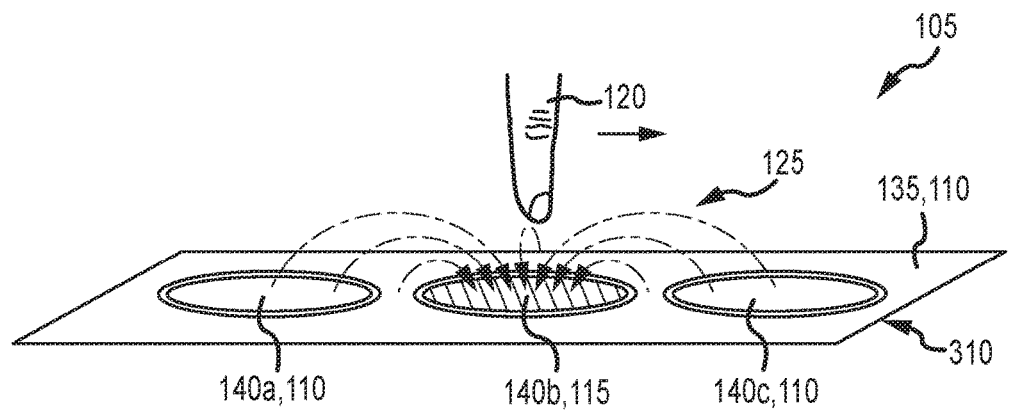
Figure 11C:
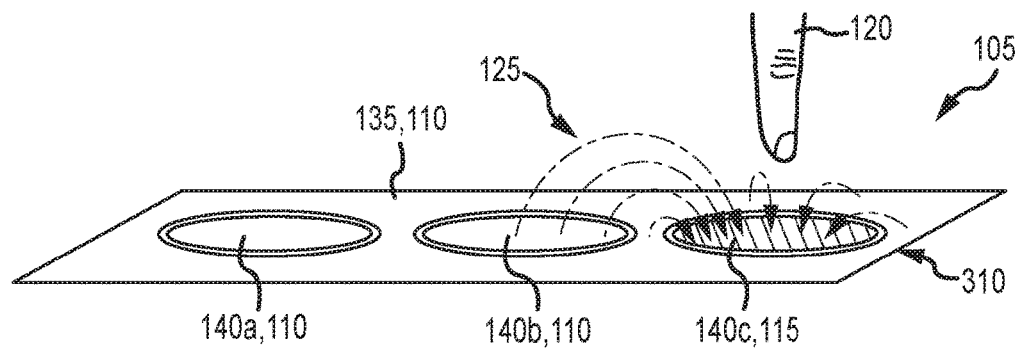

Referring to FIGS. 9 and 10, in yet another embodiment, the detection circuit 500 may comprise a switching element 900, for example a transistor, to selectively couple the multi-operation electrode 140 to one of various electrical connections.

In an exemplary embodiment, the switching element 900 may selectively couple the multi-operation electrode 140 to one of a terminal 915 of the differential amplifier 505, the voltage source 510, a high impedance element 905, or a ground terminal 910. As such, the multi-operation electrode 140 may operate as the transmission electrode 110, the reception electrode 115, or a ground electrode or a high impedance electrode.

In various embodiments, an analog-to-digital converter (not shown) may be coupled to the output terminals of the differential amplifier 505 to convert the signal to a digital value. According to various applications, the digital value may be transmitted to a central processing unit (not shown) to activate various operations of an electronic device, such as a cellular phone. For example, the central processing unit may activate a backlight in the phone, perform a selection function, activate various inputs, and the like.

In operation, the capacitive sensor 100 may be utilized to carry out a variety of detection schemes. For example the capacitive sensor 100 may detect gestures, for example hand motions, the presence or absence of an object within the 3-dimensional space, the size or shape of an object within the 3-dimensional space, the volume of a material in a container, and a variety of input selections based on the distance 315 from and movement across the sensing surface 310.

Referring to FIGS. 8 through 11, the capacitive sensor 100 may operate to detect a swiping motion across the surface of the sensing element 105. In the present embodiment, the capacitive sensor 100 comprises a plurality of the multi-operation electrodes 140 arranged next to each other with the transmission electrode 110 surrounding the plurality of the multi-operation electrodes 140, and each multi-operation electrode 140 is coupled to a dedicated switching element 900.

As the object 120 enters and interferes with the sensing field 125, the multi-operation electrode 140 receiving the most interference (i.e., an active electrode) from the object 120 will activate the associated switching element 900 to connect to the differential amplifier 505. In this case, the multi-operation electrode 140 coupled to the differential amplifier 505 is operating as the reception electrode 115. The remaining multi-operation electrodes (i.e., inactive electrodes), may be electrically coupled, via the switching elements 900, to the voltage source 510 (rather than the ground terminal 910) and operate as transmission electrodes 110. For example, and referring now to FIGS. 11A-C, the sensing element 105 comprises a transmission electrode 110, and a first, second, and third multi-operation electrode 140a, 140b, 140c. As the object 120 enters the sensing field 125, the capacitive sensor 100 senses the object 120 near one of the electrodes, in this case the first multi-operation electrode 140a, and couples the second and third multi-operation electrodes 140b, 140c to the voltage source 510 (FIG. 9) so that they also operate as transmission electrodes 110. As the object 120 moves laterally, the capacitive sensor 100 senses that the object 120 is now closer to a different electrode, in this case the second multi-operation electrode 140b, and couples that electrode to the differential amplifier terminal 915, wherein the second multi-operation electrode 140b now operates as the reception electrode 110, and the first and third multi-operation electrodes 140a, 140c are coupled to the voltage source 510 to operate as the transmission electrode 110. As the object 120 moves again in the same lateral direction, the third multi-operation electrode 140c operates as the reception electrode 110, while the first and second multi-operation electrodes 140a, 140b are coupled to the voltage source 510 to operate as the transmission electrodes 110.

In general, coupling the inactive electrodes to the voltage source 510, rather than the ground terminal 910, may increase the sensitivity of the capacitive sensor 100, since connecting to the ground terminal 910 may redirect the sensing field 125 causing a reduction in the proximity sensitivity and reducing the maximum detection distance 305 (FIG. 3).

In various embodiments, the sensing element 105 may be electrically connected to a plurality of channels (not shown) representing multiple inputs to one sensing element 105. For example, as the object 120 enters the sensing field 125, a first channel may be activated by a first predetermined voltage level which may, for example cause a screen of an electronic device, such as a cell phone, to light up. As the object 120 moves closer to the surface 310 of the sensing element 105 and the output voltage Vout increases, a second channel may be activated by a second predetermined voltage level which may cause an activation and/or selection of an input, such as a button, within the electronic device.

Referring to FIGS. 9, 10,12A-C, and 15, the capacitive sensor 100 may operate to detect the position and/or movement of the object within a 3-dimensional space, and/or detect the presence or absence of an object within the 3-dimensional space. In the present embodiment, the capacitive sensor 100 comprises a plurality of multi-operation electrodes 140 surrounded by the transmission electrode 110 and arranged on various planes to form a 3-dimensional space, wherein each plane comprises a sensing surface 310. In the present embodiment, the capacitive sensor 100 further comprises the switching element 900 so that each multi-operation electrode 140 may operate as a either a transmission electrode 110 or a reception electrode 115 in a similar manner as described above for a single plane configuration.

In this embodiment, as the object 120 enters the sensing region 1230, the multi-operation electrodes 140 may couple and uncouple to the voltage source 510 in a sequenced manner. In the present embodiment, only one multi-operation electrode 140 operates as the reception electrode 115 at any given time. The detection circuit 500 outputs a signal that corresponds to the distance 315 from the object 120 to the sensing surface 310. The capacitance data from each multi-operation electrode 140, when it is operating as the reception electrode 110, may be utilized to determine the coordinates of the object 120 within the 3-dimensional space. For example, the capacitive sensor 100 may comprise a processing unit (not shown) coupled to the output of the detection circuit 500 to receive and process the data.

Alternatively, the capacitive sensor 100 may detect the presence or absence of a stationary object based on a predetermined resting capacitance measured when there are no objects within the sensing field.

In the present embodiment, the capacitive sensor 100 may exhibit increases sensitivity and a larger sensing region 1230 than conventional sensors by coupling the multi-operation electrodes 140 to either the voltage source 510 or the differential amplifier terminal 915, rather than the ground terminal 910, since connecting to the ground terminal 910 may redirect the sensing field 125, which may create a region where the object 120 is non-detectable.

Referring again to FIGS. 9, 10, 13, 14, 16, 17, and 18, the capacitive sensor 100 may operate to measure and/or estimate a volume of liquid. In an exemplary embodiment, the first, second, and third planes 1300a-c are all parallel to each other, and each plane 1300 comprises a multi-operation electrode 140, wherein each plane 1300a-c may operate as either the transmission electrode 110, the reception electrode 115, or a high impedance electrode.

The multi-operation electrodes 140 are operated in a sequence to obtain a more accurate measurement of the liquid. According to the present embodiment, only one plane may operate as the reception electrode 115 at any given time, while the other plane(s) operate as either the transmission electrode 110 or the high impedance electrode. For example, the first plane 1300a may operate as the reception electrode 115 and the second and third planes 1300b-c may operate as the transmission electrodes 110 to measure a first liquid 1305. In a later sequence, the first plane 1300a may operate as the transmission electrode 110, the second plane may operate as the reception electrode 115, and the third plane 1300c may operate as the high impedance electrode. The capacitive sensor 100 may measure a second liquid 1310 in the same manner.

In the present embodiment, the sensing field 125 is formed between the plane operating as the reception electrode 115 and the plane operating as the transmission electrode 110. The capacitance data obtained from the sequenced operation in conjunction with predetermined baseline capacitance data regarding the measured object 120 may be utilized to obtain information about the object 120 and/or the volume of the liquid.

In an alternative embodiment, wherein the sensing element 105 is formed within sidewalls (planes) of the container 1400, the capacitive sensor 100 may detect the level 1410 and/or volume of the material 1425 based on the known dimensions of the container 1400, the dielectric constant of the material 1425, and the output voltage Vout. For example, if the container 1400 is filled with water, the water will absorb part of the sensing field 125, and the capacitance of a full container of water will be less than the capacitance of a half-full container of water. As such, the output voltage Vout will be greater for the full container compared to the half-full container. The capacitive sensor 100 may compute the volume of the material based on the output voltage Vout, length 1420, and width 1415 of the container, and the dielectric constant of the material 1425.

In various embodiments, the volume of a material, such as a liquid, may be estimated based on predetermined output voltages. For example, a test container containing a material with a known volume may be measured to determine a baseline output voltage. When subsequent containers with the same material are measured with capacitive sensor 100, the output voltage of the subsequent containers may be compared to the baseline output voltage to determine if the subsequent containers contain the same volume of material as the test container.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing description, the technology has been described with reference to specific exemplary embodiments. Various modifications and changes may be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. A 3-dimensional capacitive sensor, comprising:
a first sensing plane comprising:
 a first multi-operation electrode; and
 a first transmission electrode;
a second sensing plane positioned a predetermined distance from and substantially parallel to the first sensing plane, wherein the second sensing plane comprises:
 a second multi-operation electrode; and
 a second transmission electrode; and
a circuit coupled to the first and second sensing planes, comprising a plurality of switching devices to selectively couple each multi-operation electrode to one of:
 an amplifier, and
 a voltage source.

2. The 3-dimensional capacitive sensor according to claim 1, wherein the multi-operation electrodes are configured to operate as one of a reception electrode and a transmission electrode.

3. The 3-dimensional capacitive sensor according to claim 1, further comprising a third sensing plane, substantially orthogonal to and extending between the first and second sensing planes, wherein the third sensing plane comprises:
a third multi-operation electrode; and
a third transmission electrode.

4. The 3-dimensional capacitive sensor according to claim 1, further comprising a third sensing plane positioned a predetermined distance from and substantially parallel to at least one of the first and second sensing planes, wherein the third sensing plane comprises:
a third multi-operation electrode; and
a third transmission electrode.

5. The 3-dimensional capacitive sensor according to claim 4, wherein the plurality of switching devices may further couple the first, second, and third multi-operation electrodes to a high impedance terminal.

6. The 3-dimensional capacitive sensor according to claim 1, further comprising:
a first variable capacitor coupled in parallel with a first external capacitor; and
a second variable capacitor coupled in parallel with a second external capacitor.

7. The 3-dimensional capacitive sensor according to claim 1, wherein the circuit further comprises:
a differential amplifier coupled to the first and second sensing planes; and
a first feedback capacitor electrically coupled between a first input terminal and a first output terminal of the differential amplifier, and
a second feedback capacitor electrically coupled between a second input terminal and a second output terminal of the differential amplifier.

8. The 3-dimensional capacitive sensor according to claim 1, wherein the multi-operation electrodes are substantially aligned across from each other.

9. A method for detecting objects with a capacitive sensor, comprising:
forming an electric field between a first sensing plane and a second sensing plane positioned a predetermined distance from and substantially parallel to the first sensing plane, wherein each sensing plane comprises a first electrode configured to be selectively operated as:
 a reception electrode; and
 a transmission electrode;
operating:
 the first electrode of the first sensing plane as the reception electrode;
 the first electrode of the second sensing plane as the transmission electrode; and
measuring a capacitance formed between the first and second sensing planes.

10. The method according to claim 9, further comprising:
a third sensing plane comprising a first electrode and positioned adjacent to at least one of the first and second sensing planes,
wherein the first, second, and third sensing planes further comprise a second electrode configured to operate as the transmission electrode, wherein:
 the second electrode of each sensing plane surrounds the first electrode of the same sensing plane, and
 the first and second electrodes have a resting capacitance.

11. The method according to claim 10, wherein the third sensing plane is arranged substantially orthogonal to and extending between the first and second sensing planes.

12. The method according to claim 9, further comprising a third sensing plane positioned a predetermined distance from and substantially parallel to at least one of the first and second sensing planes.

13. The method according to claim 10, further comprising:
 operating one of the first electrodes as a high impedance electrode;
 operating one of the first electrodes as the reception electrode; and
 operating one of the first electrodes as the transmission electrode.

14. A capacitive sensor system, comprising:
 a sensing element comprising:
  a sensing capacitor, comprising:
   a first sensing plane comprising a first multi-operation electrode; and
   a second sensing plane positioned a predetermined distance from and substantially parallel to the first sensing plane, wherein the second sensing plane comprises a second multi-operation electrode;
  a reference capacitor formed in the sensing element and having a fixed capacitance;
 an integrated circuit coupled to the sensing element, wherein the integrated circuit comprises:
  a switching device to selectively couple each multi-operation electrode to at least one of:
   an amplifier to operate as a reception electrode;
   a high impedance terminal to operate as a high impedance electrode; and
   a voltage source to operate as a transmission electrode;
  a first variable capacitor coupled in series with the sensing capacitor;
  a second variable capacitor coupled in series with the reference capacitor; and
  a differential amplifier;
  an analog-to-digital converter coupled to the differential amplifier and configured to convert an output signal of the differential amplifier to a digital value; and
  a central processing unit coupled to the analog-to-digital converter, wherein the central processing unit is responsive to the digital value.

15. The capacitive sensor system according to claim 14, further comprising a third sensing plane, comprising a third multi-operation electrode, wherein:
 the first, second, and third planes further comprise a single-operation electrode configured to operate as the transmission electrode; and
 the single-operation electrode surrounds each multi-operation electrode.

16. The capacitive sensor system according to claim 15, wherein the third sensing plane is arranged substantially orthogonal to and extending between the first and second sensing planes.

17. The capacitive sensor system according to claim 16, further comprising:
 a first external capacitor coupled in parallel with the first variable capacitor; and
 a second external capacitor coupled in parallel with the second variable capacitor.

18. The capacitive sensor system according to claim 14, further comprising a third sensing plane, comprising a third multi-operation electrode, and positioned a predetermined distance from and substantially parallel to at least one of the first and second sensing planes.

19. The capacitive sensor system according to claim 14, wherein the multi-operation electrodes are aligned across from each other.

20. The capacitive sensor system according to claim 14, the integrated circuit further comprising:
 a first feedback capacitor electrically coupled between a first input terminal and a first output terminal of the differential amplifier; and
 a second feedback capacitor electrically coupled between a second input terminal and a second output terminal of the differential amplifier.

* * * * *